United States Patent
Hino et al.

(10) Patent No.: US 10,193,383 B2
(45) Date of Patent: Jan. 29, 2019

(54) DUAL-SHAFT GAS TURBINE POWER GENERATION SYSTEM, AND CONTROL DEVICE AND CONTROL METHOD FOR GAS TURBINE SYSTEM

(71) Applicant: HITACHI, LTD., Tokyo (JP)

(72) Inventors: Noriaki Hino, Tokyo (JP); Naohiro Kusumi, Tokyo (JP); Kazuo Takahashi, Tokyo (JP); Tomomichi Ito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 92 days.

(21) Appl. No.: 15/343,719

(22) Filed: Nov. 4, 2016

(65) Prior Publication Data
US 2017/0077750 A1 Mar. 16, 2017

Related U.S. Application Data

(63) Continuation of application No. 14/412,488, filed as application No. PCT/JP2012/069917 on Aug. 3, 2012, now Pat. No. 9,520,757.

(51) Int. Cl.
*F02C 3/10* (2006.01)
*H02J 13/00* (2006.01)
(Continued)

(52) U.S. Cl.
CPC .......... *H02J 13/0006* (2013.01); *F01D 15/10* (2013.01); *F02C 3/04* (2013.01);
(Continued)

(58) Field of Classification Search
CPC .... F01D 15/10; F02C 3/04; F02C 3/10; F02C 7/057; F02C 7/36; F02C 9/00; F02C 9/20;
(Continued)

(56) References Cited

U.S. PATENT DOCUMENTS 5,559,421 A * 9/1996 Miyakawa ............... H02M 1/12
307/105
5,783,932 A * 7/1998 Namba ................... H02J 9/066
290/47
(Continued)

FOREIGN PATENT DOCUMENTS

JP 61-169628 A 7/1986
JP 2003083081 A 3/2003
(Continued)

OTHER PUBLICATIONS

Translation of the Japanese Office Action received in corresponding Japanese Application No. 2016-179294 dated Jul. 11, 2017.
(Continued)

*Primary Examiner* — Thienvu Tran
*Assistant Examiner* — Brian K Baxter
(74) *Attorney, Agent, or Firm* — Mattingly & Malur, PC

(57) ABSTRACT

The dual-shaft gas turbine power generation system includes: a high-pressure gas turbine; a first rotating shaft connecting a compressor and the high-pressure gas turbine; an electric motor connected to the first rotating shaft; a governor which adjusts the amount of air taken into the compressor; a low-pressure gas turbine; a second rotating shaft connected to the low-pressure gas turbine; a synchronous power generator connected to the second rotating shaft; a frequency converter which converts the frequency of power transmitted between the synchronous power generator and the electric motor; and a control device which controls a frequency converter control device for controlling the frequency converter, and the governor, on the basis of a power output command value indicating the power to be outputted to an external grid.

12 Claims, 9 Drawing Sheets

(51) Int. Cl.
*F01D 15/10* (2006.01)
*F02C 9/00* (2006.01)
*F02C 9/20* (2006.01)
*F02C 9/54* (2006.01)
*F02C 3/04* (2006.01)
*H02K 7/18* (2006.01)
*H02P 3/02* (2006.01)
*F02C 7/057* (2006.01)
*F02C 7/36* (2006.01)
*H02J 3/34* (2006.01)

(52) U.S. Cl.
CPC ............... *F02C 3/10* (2013.01); *F02C 7/057* (2013.01); *F02C 7/36* (2013.01); *F02C 9/00* (2013.01); *F02C 9/20* (2013.01); *F02C 9/54* (2013.01); *H02J 3/34* (2013.01); *H02K 7/1823* (2013.01); *H02P 3/02* (2013.01); *F05D 2220/7642* (2013.01); *F05D 2270/053* (2013.01); *F05D 2270/335* (2013.01)

(58) Field of Classification Search
CPC . F02C 9/54; H02J 13/0006; H02J 3/34; H02J 3/14; H02K 7/1823; H02P 3/02; F05D 2220/7642; F05D 2270/053; F05D 2270/335; Y02B 70/3225; Y04S 20/222; H01R 25/003; G06F 1/266
USPC .......................................................... 307/39
See application file for complete search history.

(56) References Cited

U.S. PATENT DOCUMENTS

| | | | |
|---|---|---|---|
| 5,799,484 A | 9/1998 | Nims | |
| 5,966,925 A | 10/1999 | Torikai | |
| 6,313,544 B1 | 11/2001 | Mongia | |
| 7,180,270 B2 | 2/2007 | Rufer | |
| 2002/0148227 A1 | 10/2002 | Mackay | |
| 2004/0066044 A1* | 4/2004 | Matsuo | H02P 9/04 290/52 |
| 2005/0056021 A1* | 3/2005 | Belokon | F02C 3/113 60/772 |
| 2006/0150633 A1 | 7/2006 | McGinley et al. | |
| 2006/0225431 A1 | 10/2006 | Kupratis | |
| 2007/0137216 A1* | 6/2007 | Joshi | F02C 3/10 60/791 |
| 2009/0320438 A1 | 12/2009 | Koganezawa et al. | |
| 2010/0031667 A1 | 2/2010 | Hoffmann et al. | |
| 2011/0048119 A1 | 3/2011 | Hansen et al. | |
| 2012/0211980 A1* | 8/2012 | Desabhatla | F02C 7/275 290/31 |
| 2012/0306458 A1* | 12/2012 | Fogarty | H02P 9/08 322/32 |
| 2014/0216047 A1 | 8/2014 | Morisaki | |

FOREIGN PATENT DOCUMENTS

| | | |
|---|---|---|
| JP | 2006-291948 A | 10/2006 |
| JP | 2007-505261 A | 3/2007 |
| JP | 2007-170391 A | 7/2007 |
| JP | 2009293618 A | 12/2009 |
| JP | 2010/065636 A | 3/2010 |
| JP | 2010-518321 A | 5/2010 |
| JP | 2010-285955 A | 12/2010 |
| JP | 2011-047404 A | 3/2011 |
| WO | 2005/028832 A1 | 3/2005 |

OTHER PUBLICATIONS

Chinese Office Action received in corresponding Chinese Application No. 201280074831.2 dated Nov. 9, 2015.
Japanese Office Action received in corresponding Japanese Application No. 2014-527937 dated Nov. 10, 2015.
Japanese Office Action received in corresponding Japanese Application No. 2014-527937 dated Jun. 21, 2016.
Chinese Office Action received in corresponding Chinese Application No. 201280074831.2 dated Jun. 23, 2016.

* cited by examiner

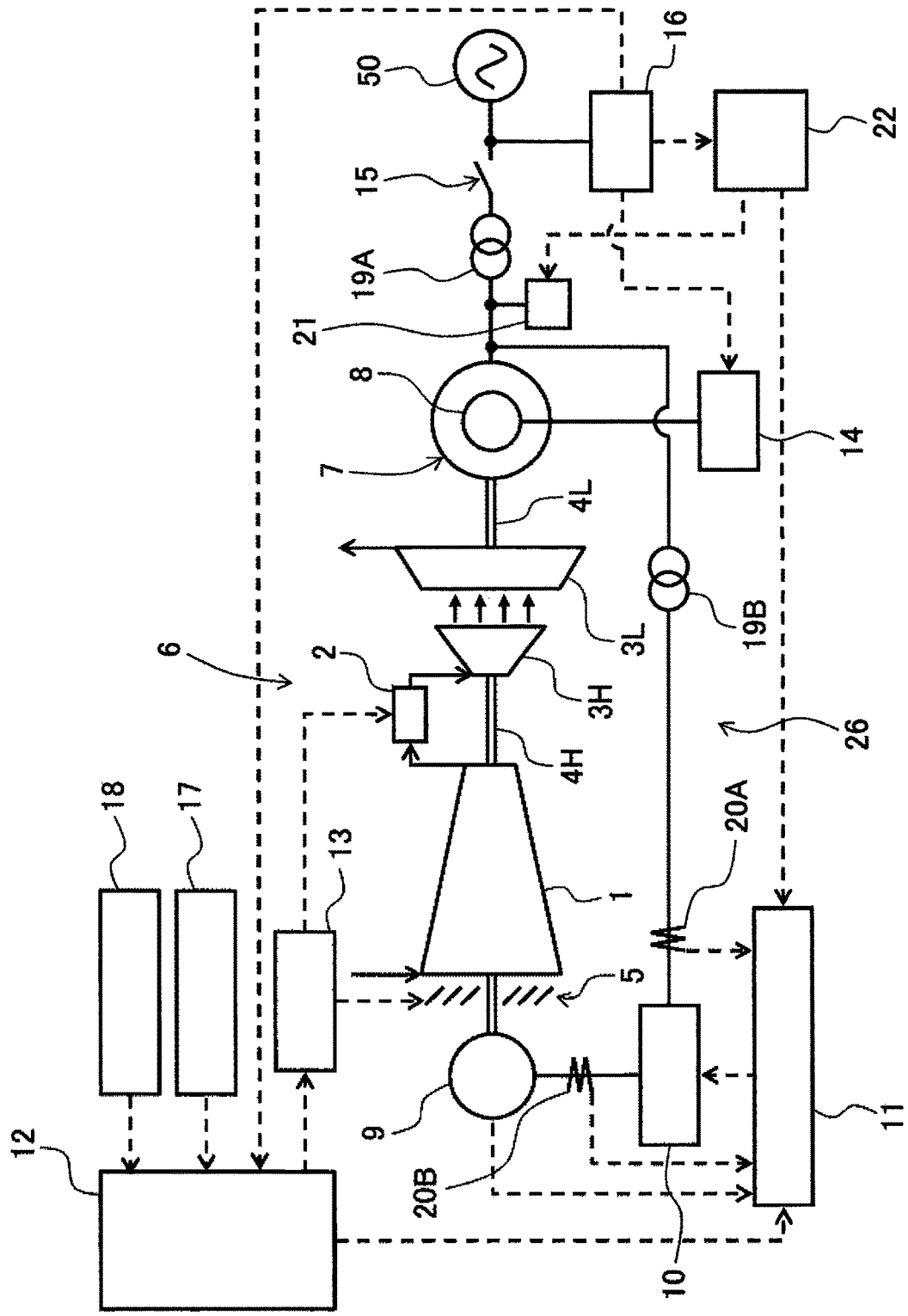
[FIG. 1]

[FIG. 2]
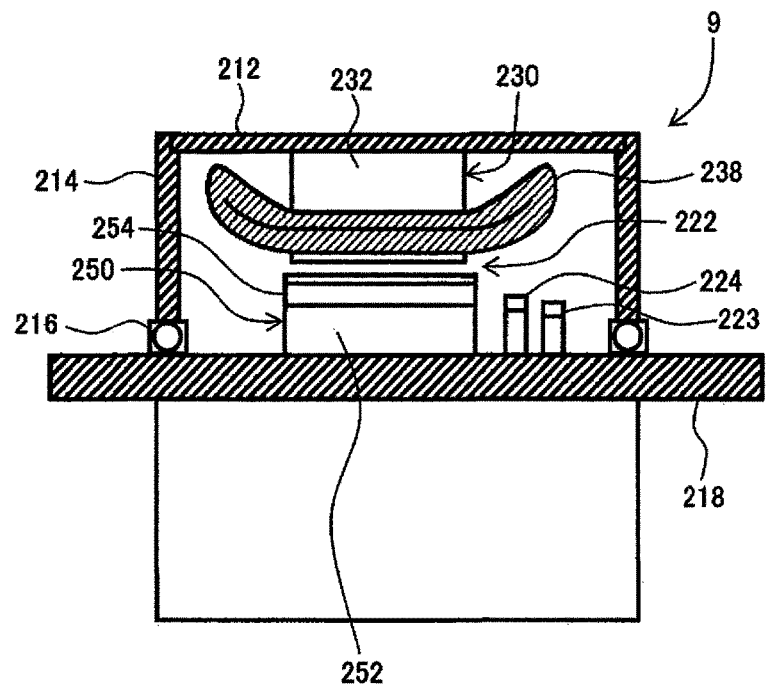
[FIG. 3]
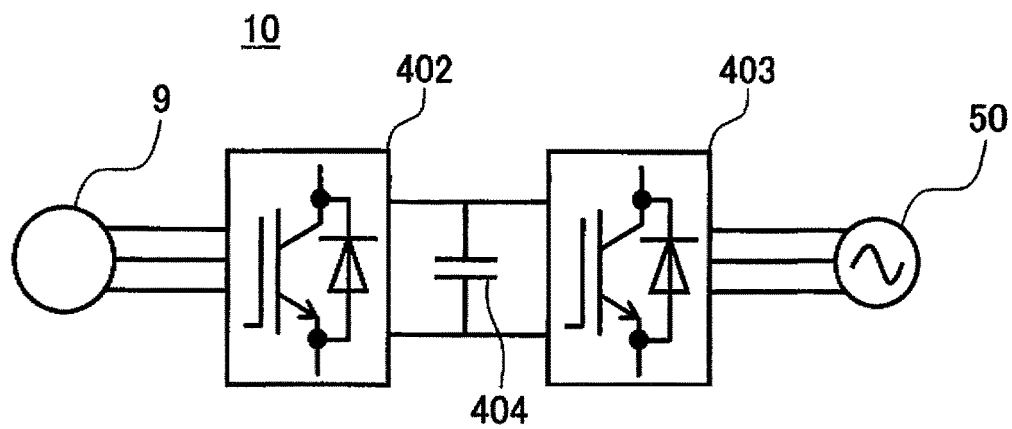

[FIG. 4]
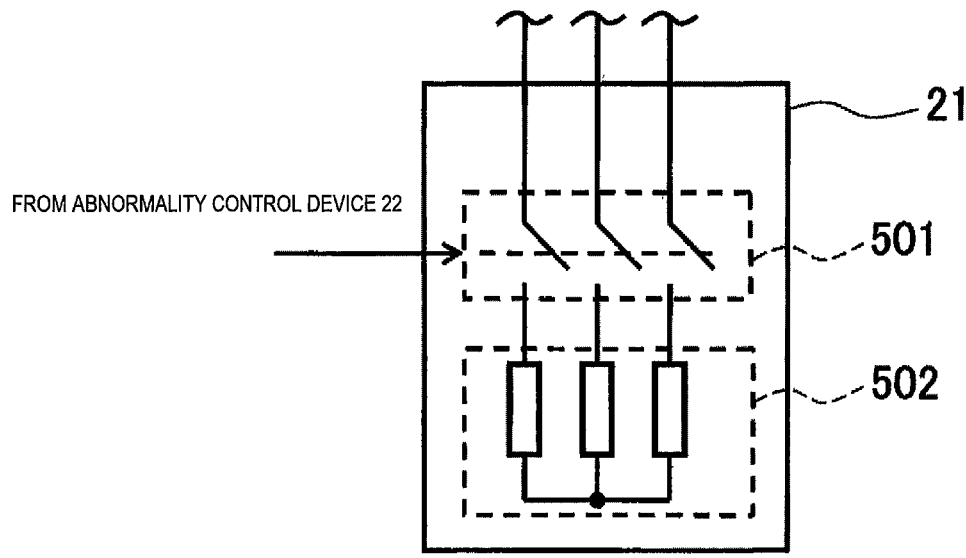
FROM ABNORMALITY CONTROL DEVICE 22
[FIG. 5]
ATMOSPHERIC TEMPERATURE CHARACTERISTIC OF DUAL-SHAFT GAS TURBINE OUTPUT
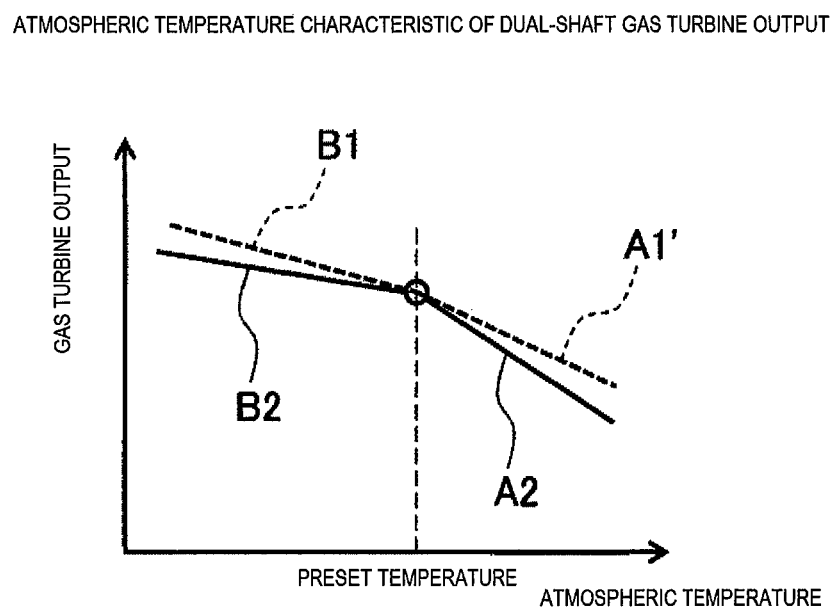

[FIG. 6]
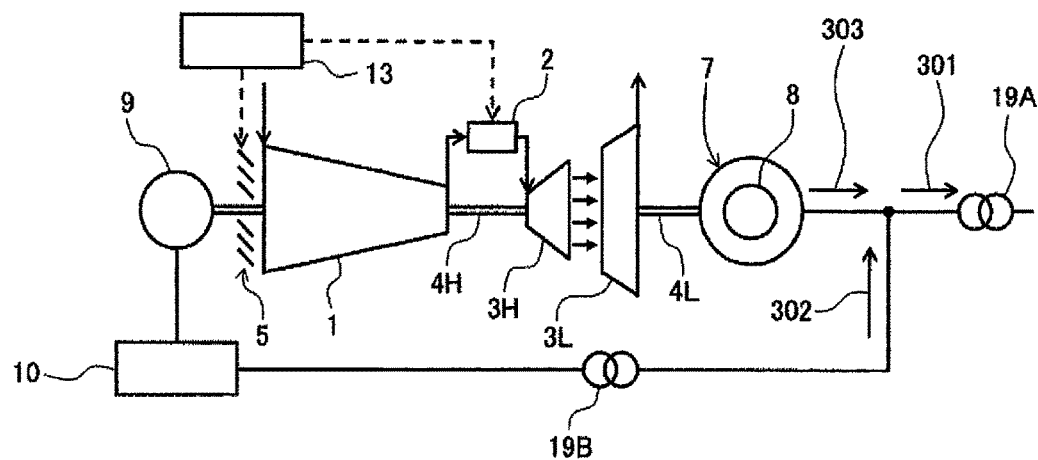
[FIG. 7]
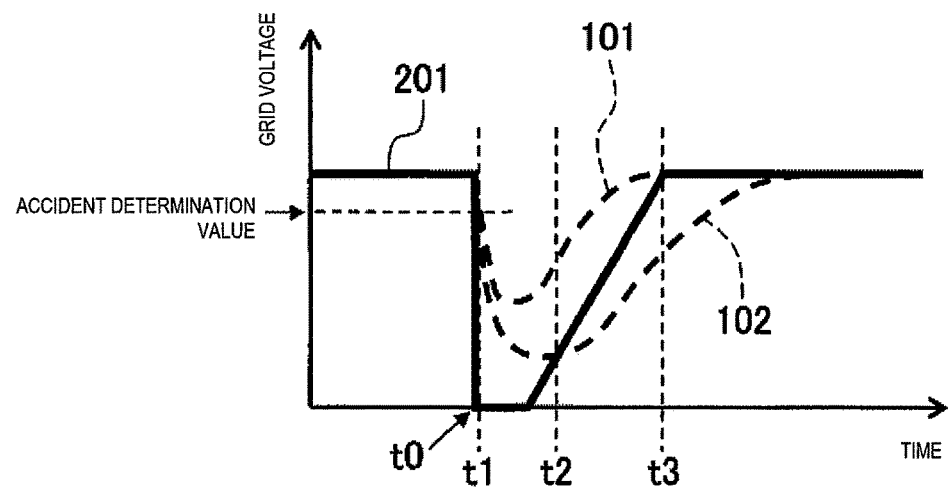

[FIG. 8]
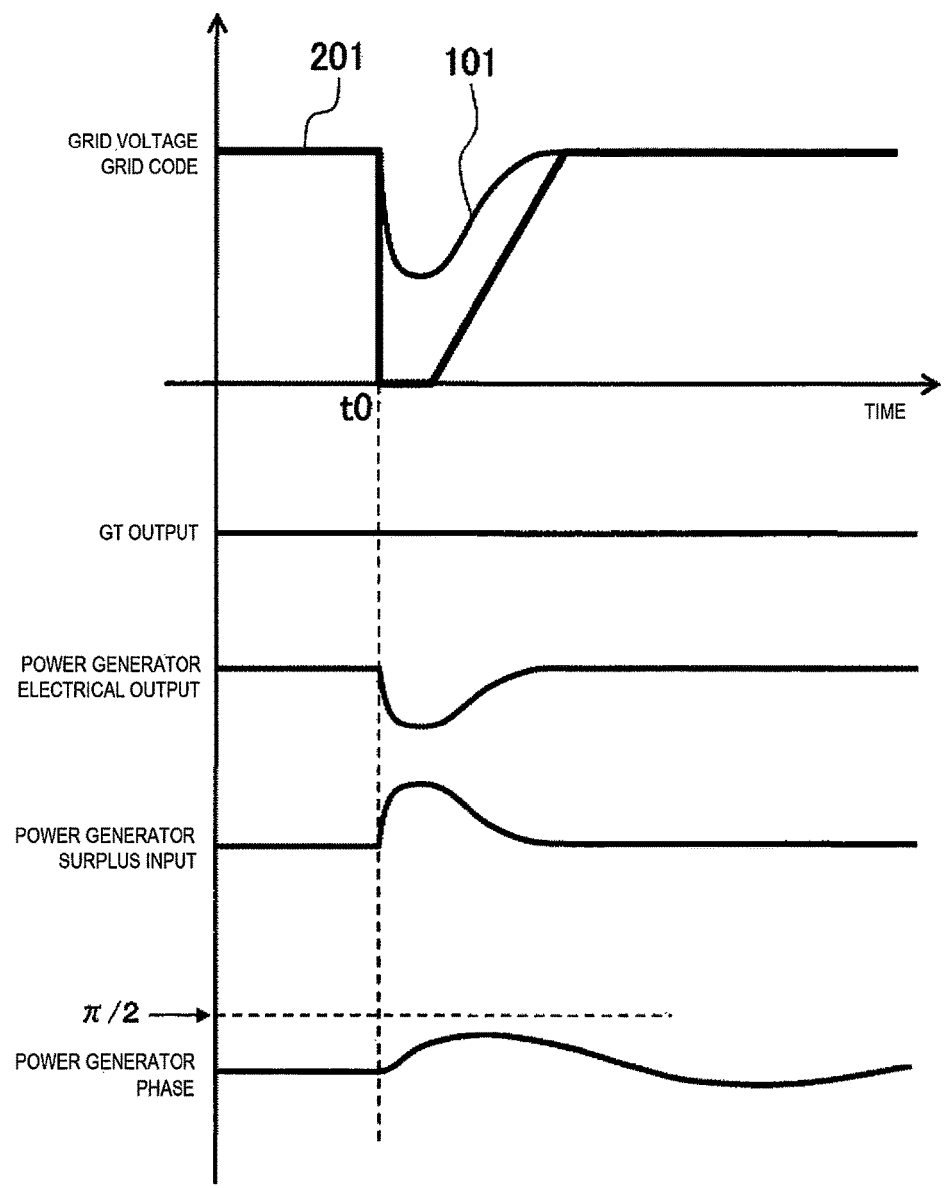

[FIG. 9]
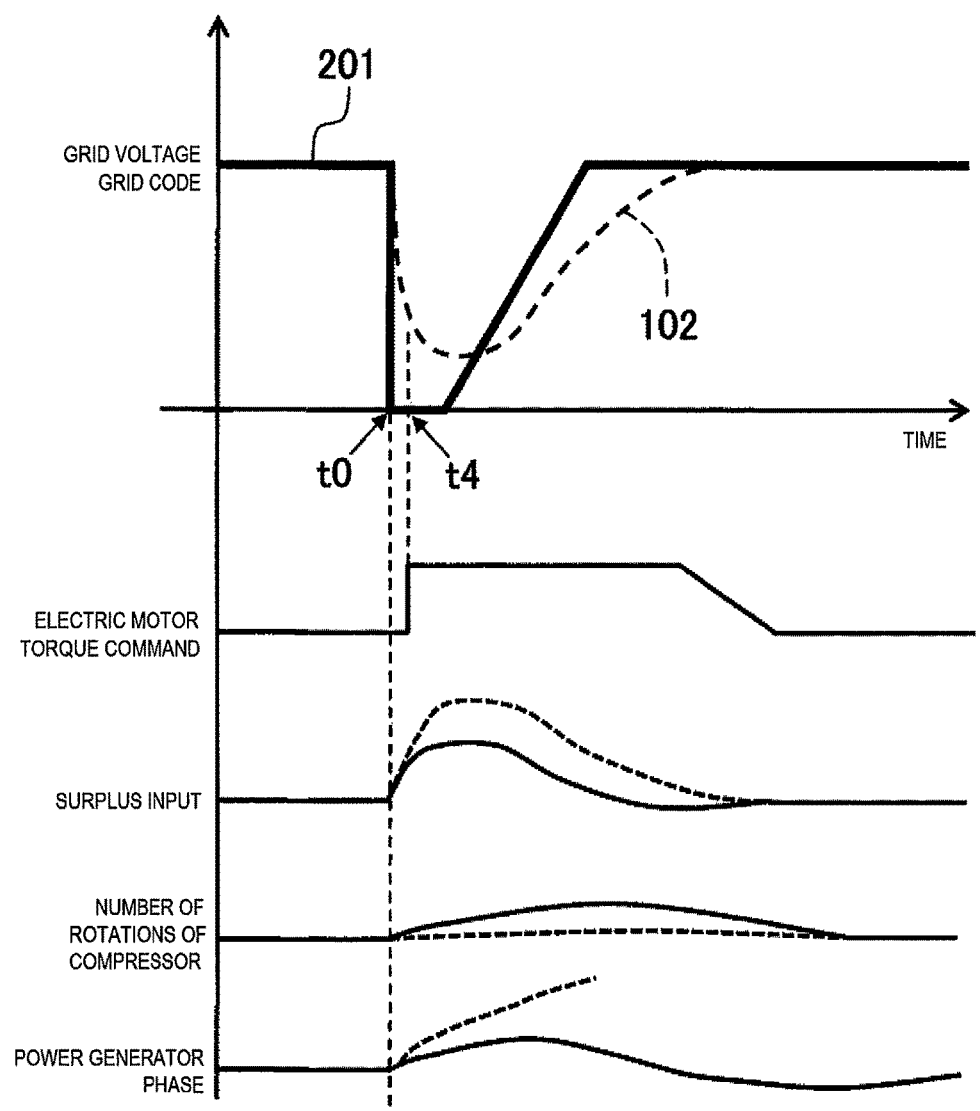

[FIG. 10]
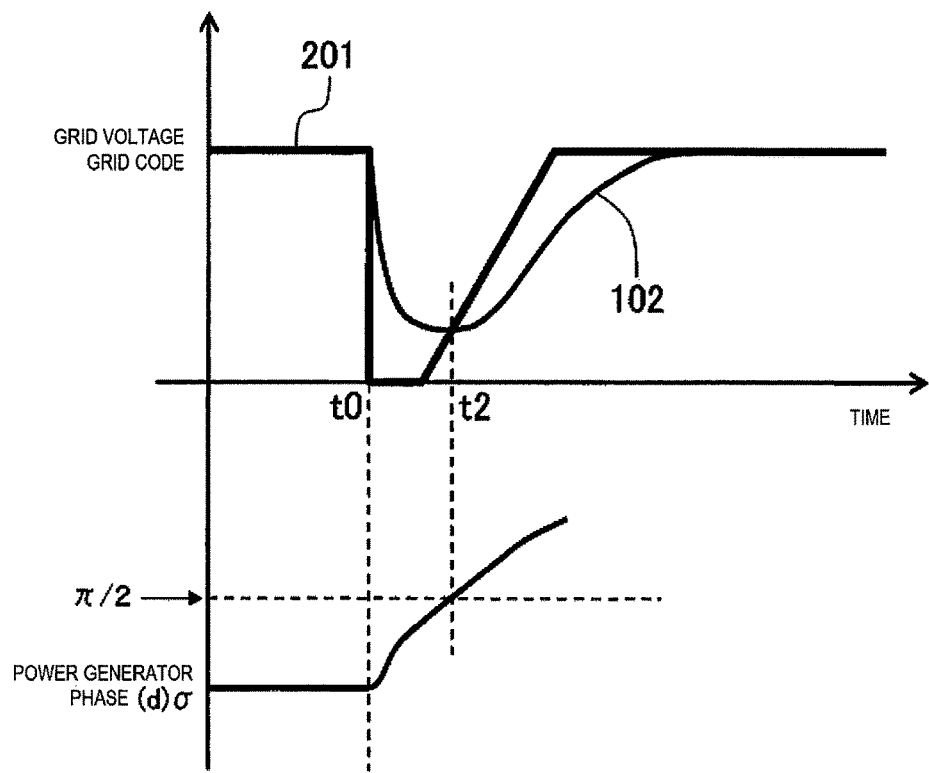
[FIG. 11]
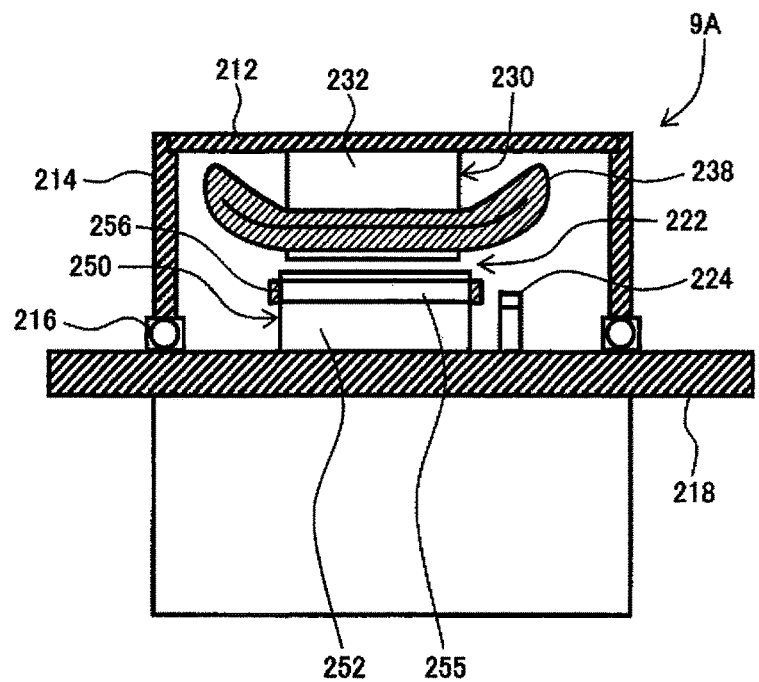

[FIG. 12]
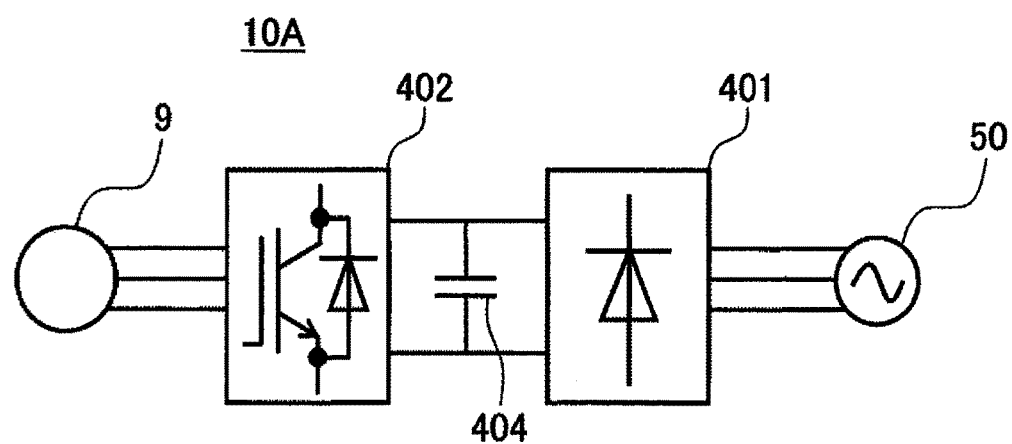

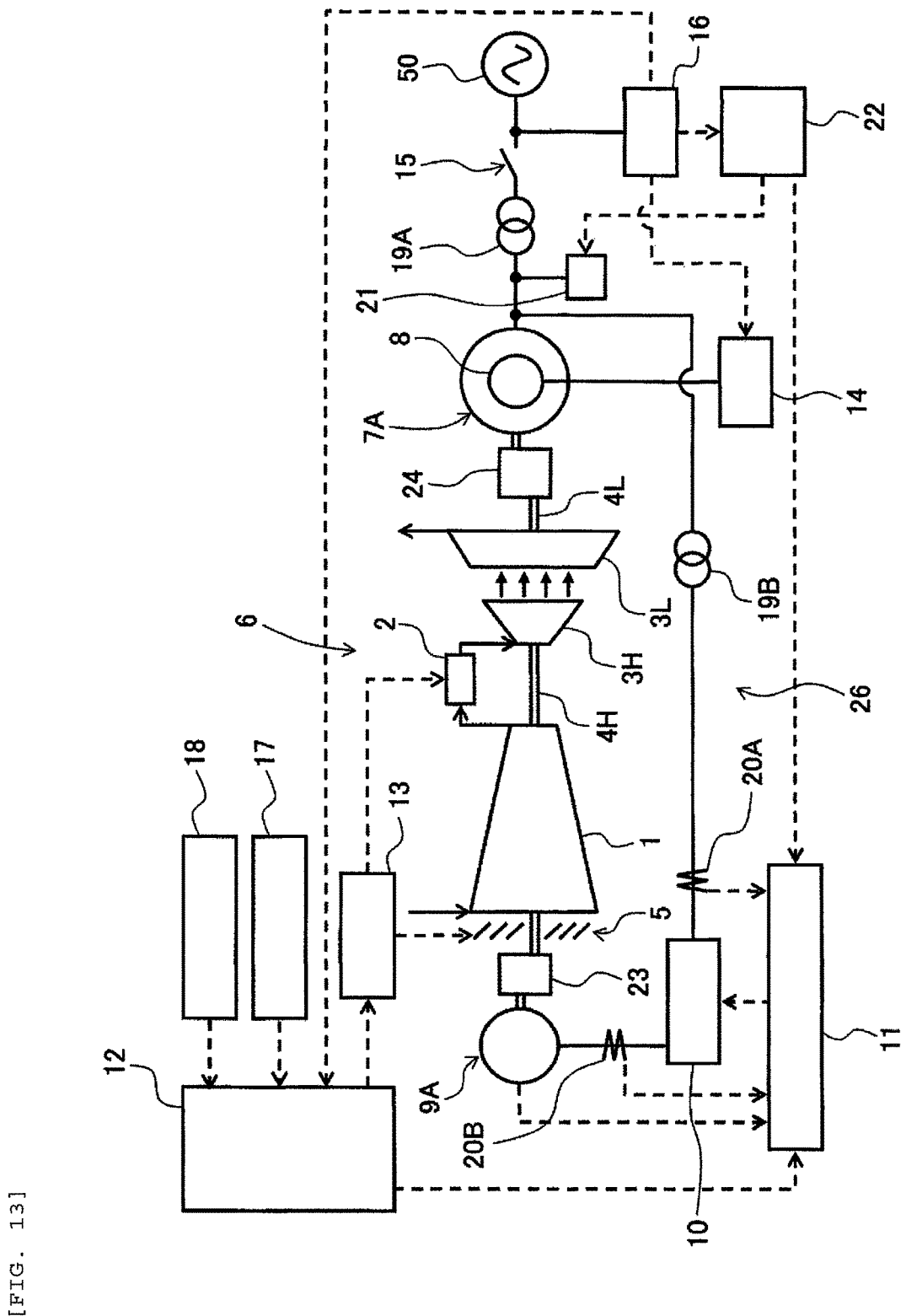
[FIG. 13]

DUAL-SHAFT GAS TURBINE POWER GENERATION SYSTEM, AND CONTROL DEVICE AND CONTROL METHOD FOR GAS TURBINE SYSTEM

CROSS REFERENCE TO RELATED APPLICATION

This application is a continuation application of U.S. application Ser. No. 14/412,488, filed Jan. 2, 2015, the entirety of the contents and subject matter of all of the above is incorporated herein by reference.

TECHNICAL FIELD

The present invention relates to a dual-shaft gas turbine power generation system using a dual-shaft gas turbine, and a control device and a control method for a gas turbine system.

BACKGROUND ART

As a technique related to a gas turbine that drives a load of a power generator or the like, for example, PTL 1 (JP-A-2010-65636) discloses a dual-shaft gas turbine having two rotating shafts including a rotating shaft that connects a high-pressure turbine driven by a combustion gas generated in a combustor and a compressor for feeding compressed air to the combustor, and a rotating shaft that connects a low-pressure turbine driven by the combustion gas driving the high-pressure turbine and a load such as a power generator.

CITATION LIST

Patent Literature

PTL 1: JP-A-2010-65636

SUMMARY OF INVENTION

Technical Problem

In the dual-shaft gas turbine as described in the above related art, the low-pressure turbine driving a machine to be driven such as a pump or power generator, and the gas generator (compressor and high-pressure turbine) generating an actuation gas for the low-pressure turbine can be operated at different numbers of rotations. Therefore, for example, even if the number of rotations of the machine to be driven is lower than the rated number of rotations on the gas turbine side, high efficiency can be achieved by rotating the compressor and the high-pressure turbine at a high speed and generating an actuation gas with a higher expansion work capacity in the low-pressure turbine.

However, in the dual-shaft gas turbine as in the above related art, there is a temperature limitation on the high-pressure turbine and a mechanical limitation in terms of centrifugal force on the rotation speed of the compressor. These limitations may consequently cause a fall in efficiency.

That is, for example, if the temperature of the outside air taken into the compressor is higher than a preset value, the density of the air is relatively low. In this case, since the work of the combustion gas on the turbine decreases, the rotation speed falls and the flow rate of the air of the compressor decreases. Therefore, the combustion temperature rises and the temperature of the high-pressure turbine vane rises, too. Since the high-pressure turbine has the temperature limitation, the fuel must be reduced and consequently the output and efficiency fall.

Meanwhile, if the temperature of the outside air taken into the compressor is lower than a preset value, the density of the air is relatively high. In this case, since the work of the combustion gas on the turbine increases, the rotation speed rises. As the compressor has the limitation on the rotation speed, the fuel must be reduced and consequently the output and efficiency fall.

In view of the foregoing, an object of the invention is to provide a dual-shaft gas turbine power generation system and a control device and a control method for a gas turbine system in which a fall in efficiency due to change in the temperature of the outside air can be retrained.

Solution to Problem

To achieve the above object, the invention is provided with: a compressor which pressurizes air and generates compressed air; a combustor which mixes and combusts the compressed air and a fuel; a high-pressure gas turbine which is driven by a combustion gas obtained in the combustor; a first rotating shaft which connects the compressor and the high-pressure gas turbine; an electric motor connected to the first rotating shaft; a governor which adjusts an amount of air taken into the compressor and thus controls an output of the high-pressure gas turbine; a low-pressure gas turbine driven by the combustion gas after driving the high-pressure gas turbine; a second rotating shaft connected to the low-pressure gas turbine; a synchronous power generator connected to the second rotating shaft; a frequency converter which is provided on a power transmission path for transmitting power between the synchronous power generator connected to an external grid and the electric motor, and converts a frequency of power to be transmitted; and a control device which controls a frequency converter control device for controlling the frequency converter, and the governor, on the basis of a power output command value indicating power to be outputted to the external grid, and thus controls a total output of the gas turbines and the electric motor.

In this way, the total output of the gas turbines and the electric motor is controlled by controlling the frequency converter control device for controlling the frequency converter and the governor on the basis of the power output command value indicating the power to be outputted to the external grid. Therefore, a fall in efficiency due to change in the temperature of the outside air can be restrained.

Advantageous Effect of Invention

According to the invention, a fall in efficiency due to change in the temperature of the outside air can be restrained.

BRIEF DESCRIPTION OF DRAWINGS

FIG. 1 is a view schematically showing the overall configuration of a dual-shaft gas turbine power generation system according to a first embodiment.

FIG. 2 is a view schematically showing the configuration of an electric motor.

FIG. 3 is a view schematically showing the configuration of a frequency converter.

FIG. 4 is a view schematically showing the configuration of a resistance circuit.

FIG. 5 is a view schematically showing an atmospheric temperature characteristic of an output of a dual-shaft gas turbine in normal-time control by a control device.

FIG. 6 is a view showing the relation between an output of a synchronous power generator, an output of the electric motor, and the total output thereof.

FIG. 7 is a view showing the relation between a temporal change in voltage of instant voltage drop as an example of a voltage abnormality in an external grid, and a grid code.

FIG. 8 is a view showing physical quantities of the dual-shaft gas turbine and the synchronous power generator in the case where a voltage change occurs.

FIG. 9 is a view showing physical quantities of the dual-shaft gas turbine and the synchronous power generator in the case where a voltage change occurs.

FIG. 10 is a view showing the phase of the synchronous power generator in the case where a voltage change occurs and a step out takes place.

FIG. 11 is a view schematically showing the configuration of an electric motor according to a modification of the first embodiment.

FIG. 12 is a view schematically showing the configuration of a frequency converter according to the modification of the first embodiment.

FIG. 13 is a view schematically showing the overall configuration of a dual-shaft gas turbine power generation system according to a second embodiment.

DESCRIPTION OF EMBODIMENTS

First Embodiment

A first embodiment of the invention will be described, referring to the drawings.

FIG. 1 is a view schematically showing the overall configuration of a dual-shaft gas turbine power generation system according to this embodiment. Also, FIG. 2, FIG. 3, and FIG. 4 are views schematically showing the configurations of an electric motor, a frequency converter, and a resistance circuit, respectively.

In FIG. 1, the dual-shaft gas turbine power generation system of this embodiment, on the whole, includes a dual-shaft gas turbine 6, an electric motor 9 connected to the dual-shaft gas turbine 6, a synchronous power generator 7 driven by the dual-shaft gas turbine 6, a frequency converter 10 which is provided on a power transmission path 26 for transmitting power between the synchronous power generator 7 connected to an external grid 50 and the electric motor 9 and converts the frequency of power to be transmitted, and a control device 12 which controls the operation of the whole dual-shaft gas turbine power generation system.

The dual-shaft gas turbine 6 includes a compressor 1 which pressurizes air taken therein (outside air) and generates compressed air, a combustor 2 which mixes and combusts the compressed air and a fuel, a high-pressure gas turbine 3H driven by a combustion gas obtained in the combustor 2, a first rotating shaft 4H connecting the compressor 1 and the high-pressure gas turbine 3H, a governor 13 which adjusts the amount of air taken into the compressor 1 and thus controls an output of the high-pressure gas turbine 3H, a low-pressure gas turbine 3L driven by the combustion gas after driving the high-pressure gas turbine 3H, and a second rotating shaft 4L connected to the low-pressure gas turbine 3L.

The governor 13 controls an inlet guide vane 5 (IGV), which is a flow rate adjustment valve provided at an air intake port of the compressor 1, and the injected fuel in the combustor 2, and thus adjusts the rotation speed and output of the dual-shaft gas turbine 6.

The synchronous power generator 7 is connected to the second rotating shaft 4L. The synchronous power generator 7 has a power generator rotor 8 that is controlled by an automatic voltage regulator (AVR) 14. The power generator rotor 8 is driven by the rotational force of the low-pressure turbine 3L transmitted by the second rotating shaft 4L. The automatic voltage regulator 14 controls the output voltage from the synchronous power generator 7 on the basis of a detection signal from a voltage measuring device 16 (described later). The second rotating shaft 4L connected to the low-pressure turbine 3L, and the synchronous power generator 7, are mechanically connected without having a gear in-between. Therefore, the rotation speeds of the low-pressure turbine 3L and the synchronous power generator 7 are always controlled to be constant speeds so as to be synchronous with the frequency of the external grid 50. For example, if the synchronous power generator 7 is a 2-pole generator and has an output frequency of 50 Hz, the rotation speed thereof is controlled to a constant speed of 3000 min$^{-1}$. Meanwhile, if the synchronous power generator 7 is a 4-pole generator and has an output frequency of 50 Hz, the rotation speed thereof is controlled to a constant speed of 1500 min$^{-1}$. Similarly, if the synchronous power generator 7 is a 2-pole or 4-pole generator and has an output frequency of 60 Hz, the rotation speed thereof is controlled to a constant speed of 1800 min$^{-1}$ or 3600 min$^{-1}$.

The electric motor 9 is connected to the first rotating shaft 4H. The electric motor 9 is driven by the rotational force of the compressor 1 and the high-pressure turbine 3H transmitted by the first rotating shaft 4H. As the electric motor 9, a motor with a smaller capacity than that of the synchronous power generator 7 is used. Also, the first rotating shaft 4H connected to the compressor 1 and the high-pressure turbine 3H, and the electric motor 9, are mechanically connected without having a gear in-between.

As shown in FIG. 2, the electric motor 9 has a stator 230 and a rotor 250. The stator 230 is housed in a housing 212. The stator 230 includes a stator iron core 230 fixed to the housing, and a stator winding 238 fixed to the stator iron core 230. Meanwhile, the rotor 250 includes a shaft 218, a rotor iron core 252 fixed to the shaft 218, and a permanent magnet 254 embedded in the rotor iron core 252.

An end bracket 214 is provided on both sides in the axial direction of the housing 212 (on both sides in the left and right direction in FIG. 2). The shaft 218 is rotatably held via a bearing 216 provided on the end bracket 214. The shaft 218 is mechanically connected to the first rotating shaft 4H of the dual-shaft gas turbine 6. The stator 230 and the rotor 250 are arranged in such a way that a gap 222 is provided between the stator and the rotor.

On the shaft 218, a magnet position detector 224 which detects the magnet position and sends a detection signal to a frequency converter control device 11 (described later), and a rotation speed detector 223 which detects the rotation speed of the shaft 218, are provided. The detection of the rotation speed by the rotation speed detector 223 can be calculated on the basis of the magnet position detected by the magnet position detector 224. Therefore, in this case, the rotation speed detector 223 maybe omitted. Also, in the case where sensorless vector control is performed, the magnet position detector 223 may be omitted.

Since the rated rotation speed of the compressor 1 is a high speed, the electric motor 9 connected to the first rotating shaft is driven at a high speed of, for example, 3600 min$^{-1}$ or higher. Therefore, the electric motor 9 connected to the first rotating shaft needs to have a structure that can cope with high-speed rotation. A permanent magnet electric motor using the permanent magnet 254 for the rotor 250, like the electric motor 9 of this embodiment, can easily take a mechanical balance because the rotor 250 can be formed with a simple structure, and therefore the electric motor can cope with high-speed rotation relatively easily. Also, such an electric motor 9 is advantageous in that the electric motor has a robust structure and that the maintenance thereof is easy.

Go back to FIG. 1.

The output of the synchronous power generator 7 is connected to the external grid 50, via a transformer 19A which converts voltage, and a circuit breaker 15 provided in such a way as to be able to interrupt the transmission of power from the transformer 19A. A voltage measuring device 16, which detects the voltage of the external grid 50, is provided between the circuit breaker 15 and the external grid 50. The result of the detection by the voltage measuring device 16 is sent to the control device 12, the automatic voltage regulator 14, and an abnormality control device 22 (described later).

Also, in the power transmission path between the synchronous power generator 7 and the transformer 19A, a resistance circuit 21 connected in parallel between the synchronous power generator 7 and the transformer 19A and provided with a switching device 501 for switching between connection (in other words, a short circuit) and cut-off (in other words, an open circuit) between the synchronous power generator 7 and the transformer 19A on the basis of a control signal from the abnormality control device 22 (described later) is arranged (see FIG. 4). The resistance circuit 21 has a resistor 502 which is connected in parallel to the power transmission path between the synchronous power generator 7 and the transformer 19A via the switching device 501. If the resistor 502 is in a disconnected state by the switching device 501, the resistance circuit 21 has no influence on the power transmission between the synchronous power generator 7 and the transformer 19A. If the resistor 502 is in a connected state by the switching device 501, the resistance circuit 21 consumes the power between the synchronous power generator 7 and the transformer 19A.

Also, the output of the synchronous power generator 7 is connected to the electric motor 9 via the power transmission path 26. The power transmission path 26 is to transmit power between the side of the synchronous power generator 7, of the transformer 19A, and the electric motor 9. On the power transmission path 26, the frequency converter 10, which performs frequency conversion and switches the transmitting direction of the power transmitted between the synchronous power generator 7 and the electric motor 9, and a transformer 19B which converts the voltage of the power transmitted between the synchronous power generator 7 and the frequency converter 10 are provided.

The frequency converter 10 is controlled by the frequency converter control device 11. The frequency converter control device 11 controls the frequency converter 10 on the basis of detection signals from current sensors 20A, 20B provided on the side of the synchronous power generator 7 (that is, on the side of the transformer 19A) and on the side of the electric motor 9, respectively, of the frequency converter 10 on the power transmission path 26, a control signal from the control device 12, and an abnormal-time control signal from the abnormality control device 22, and performs frequency conversion and switches the transmitting direction of the power transmitted between the synchronous power genera- tor 7 and the electric motor 9. As the torque applied to the compressor 1 from the electric motor 9 via the first rotating shaft is controlled by the frequency converter control device 11, the compressor 1 can be controlled at variable speeds.

As shown in FIG. 3, the frequency converter 10 includes a converter 403 which converts AC power on the side of the external grid 50 (that is, on the side of the synchronous power generator 7) to DC, a converter 402 which converts the DC-converted power to AC and transmits the power to the side of the electric motor 9, and a capacitor 404 which smoothes the amount of change in power between the converter 403 and the converter 402. Also, each of the converters 402, 403 has both the function of converting AC power to DC and the function of converting DC power to AC. Therefore, in the case where the power on the side of the electric motor 9 is to be frequency-converted and transmitted to the side of the synchronous power generator 7, the AC power on the side of the electric motor 9 is converted to DC by the converter 402, the amount of change in power is smoothed by the capacitor 404, and the DC-converted power is converted to AC by the converter 403 and transmitted to the side of the synchronous power generator 7.

Go back to FIG. 1.

The control device 12 controls the frequency converter control device 11 and the governor 13 on the basis of a power output command value 18 outputted from a higher-order control device (not shown), or a measurement result from an outside air state measuring device (thermometer, barometer, hygrometer) 17 which measures the state (atmospheric temperature, atmospheric pressure, humidity) of the air taken into the compressor 1, and the power output command value 18, and thereby controls the total output of the output of the dual-shaft gas turbine 6 and the electric motor 9.

The abnormality control device 22 detects a voltage abnormality generated in the external grid 50, on the basis of the result of comparison between a predetermined determination reference value (grid code, described later) for voltage abnormality in the external grid 50 and a measurement result from the voltage measuring device 16. If a voltage abnormality is detected, that is, if it is determined that a voltage abnormality is generated in the external grid 50, the abnormality control device 22 controls the switching device 501 of the resistance circuit 21 to switch from cut-off to connection. Otherwise, the abnormality control device 22 controls the switching device 501 of the resistance circuit 21 to a cut-off state. Also, if a voltage abnormality in the external grid 50 is detected, the abnormality control device 22 sends an abnormal-time control signal to the frequency converter control device 11.

In normal times when the abnormality control device 22 does not detect a voltage abnormality in the external grid 50, the frequency converter control device 11 operates according to the control by the control device 12 (normal-time control, described later). In abnormal times when a voltage abnormality is detected, the frequency converter control device 11 operates according to the control by the abnormality control device 22 (abnormal-time control, described later).

Here, processing of voltage abnormality determination for the external grid 50 by the abnormality control device 22 will be described.

FIG. 7 shows the relation between a temporal change in voltage of instant voltage drop as an example of a voltage abnormality in the external grid 50, and a grid code. The vertical axis represents the grid voltage of the external grid 50. The horizontal axis represents time.

In FIG. 7, the grid code is indicated by a solid line 201, and two examples of voltage waveforms when an instant voltage drop occurs are indicated by dashed lines 101, 102.

As the numeric setting at each time of the grid code, for example, according to the European grid codes, the period from a time t0 when an instant voltage drop occurs to a time t2 is set to approximately 0.1 to 0.2 seconds, and the period from the time t0 to a time t3 is set to approximately 1 second.

For example, if the voltage changes within the range of the grid code 201 as indicated by the dashed line 101 due to an abnormality in the external grid 50, the abnormality control device 22 does not determine that a voltage abnormality is generated in the external grid 50. Meanwhile, for example, if the voltage intersects with the grid code 201 as indicated by the dashed line 102 (see the time t2) and changes to exceed the range of the grid code 201 due to an abnormality in the external grid 50, the abnormality control device 22 determines that a voltage abnormality is generated in the external grid 50, and performs abnormal-time control.

Here, details of the normal-time control and the abnormal-time control in the dual-shaft gas turbine power generation system of this embodiment configured as described above will be described.

Normal-Time Control

In normal times when the abnormality control device 22 does not detect a voltage abnormality in the external grid 50, the control device 12 controls the frequency converter control device 11 and the governor 13 on the basis of the power output command value 18 outputted from a higher-order control device (not shown), or the measurement result from then outside air state measuring device 17, which measures the state (atmospheric temperature, atmospheric pressure, humidity) of the air taken into the compressor 1, and the power output command value 18, and thereby controls the total output of the output of the dual-shaft gas turbine 6 and the electric motor 9.

FIG. 5 is a view schematically showing the atmospheric temperature characteristic of the output of the dual-shaft gas turbine in the normal-time control by the control device 12. The vertical axis represents gas turbine output. The horizontal axis represents atmospheric temperature. Here, the atmospheric temperature is the temperature of the air taken into the compressor 1. In FIG. 5, characteristic lines A1, B1 show characteristics in the normal-time control of this embodiment, and characteristic lines A2, B2 show characteristics of a comparative example in which the normal-time control of this embodiment is not carried out.

If the atmospheric temperature is within a preset temperature range, the control device 12 controls the operation of the dual-shaft gas turbine 6 via the governor 13 and also controls the operation of the frequency converter 10 via the frequency converter control device 11, and performs control such that a total output 301 of an output 303 of the synchronous power generator 7 driven by the dual-shaft gas turbine 6 and an output 302 of the electric motor 9 is balanced at the power command value 18 (see FIG. 6). Here, if control is performed so that the compressor 1 is assisted by the electric motor 9, a value obtained by subtracting an input of the electric motor 9 required for the assistance (supplied power in the opposite direction of the output 302) from the output 303 of the dual-shaft gas turbine 6 is the output 301 to the external grid 50. Meanwhile, if braking is applied on the compressor 1 by the electric motor 9, the total of the output 303 from the dual-shaft gas turbine 6 and the output 302 from the electric motor 9 is the output to the external grid 50.

The dual-shaft gas turbine 6 is designed and controlled in such a way that as the temperature of the combustion gas in the combustor 2 becomes higher, efficiency increases and therefore the best performance is achieved at the time of the rated load operation as described above, that is, the temperature of the combustion gas becomes the critical temperature of the component material of the high-pressure turbine 3H.

If the atmospheric temperature becomes higher than a preset value, the control device 12 controls the operation of the frequency converter 10 via the frequency converter control device 11 so as to generate a driving force in the forward direction (the same direction as the rotating direction of the compressor 1) in the electric motor 9. At this time, the rotation of the compressor 1 is assisted by the electric motor 9 via the first rotating shaft 4H.

In this way, if the temperature of the outside air taken into the compressor 1 is higher than a preset value, the density of the air is relatively low. In this case, since the work on the turbine by the combustion gas decreases, the rotation speed falls and the air flow rate in the compressor decreases. Therefore, the combustion temperature rises and the temperature of the high-pressure turbine vane rises, too. Since the high-pressure turbine has the temperature limitation, in the comparative example, the fuel must be reduced and consequently the output and efficiency fall, as indicated by the characteristic line A2.

In contrast, in the embodiment, as the electric motor 9 assists the rotation of the compressor 1 via the first rotating shaft 4H, the flow rate of the air supplied to the combustor can be increased and consequently a larger amount of fuel can be injected. Therefore, the atmospheric temperature characteristic of the dual-shaft gas turbine 6 is improved from the characteristic line A2 to the characteristic line A1.

Also, if the atmospheric temperature becomes lower than a preset value, the control device 12 controls the operation of the frequency converter 10 via the frequency converter control device 11 so as to generate a driving force in the opposite direction (the opposite direction of the rotating direction of the compressor 1) in the electric motor 9. At this time, braking is applied on the rotation of the compressor 1 by the electric motor 9 via the first rotating shaft 4H.

In this way, if the temperature of the outside air taken into the compressor 1 is lower than a preset value, the density of the air is relatively high. In this case, since the work of the combustion gas on the turbine increase, the rotation speed rises. As the compressor 1 has the limitation on the rotation speed, the fuel must be reduced and consequently the output and efficiency fall as indicated by the characteristic line B2.

In contrast, in the embodiment, as braking is applied on the rotation of the compressor 1 by the electric motor 9 via the first rotating shaft 4H, the flow rate of the air supplied to the combustor 2 can be reduced and consequently the temperature of the combustion gas can be raised. Therefore, the atmospheric temperature characteristic of the output of the dual-shaft gas turbine 6 is improved from the characteristic line B2 to the characteristic line B1.

Abnormal-Time Control

If it is determined that a voltage abnormality is generated in the external grid 50, the abnormality control device 22 controls the switching device 501 of the resistance circuit 21 to switch from cut-off to connection. Otherwise, the abnormality control device 22 controls the switching device 501 of the resistance circuit 21 to a cut-off state. Also, if a voltage abnormality in the external grid 50 is detected, the abnormality control device 22 sends an abnormal-time control signal to the frequency converter control device 11 so as to control the frequency converter 10 and thus to control the rotational driving of the electric motor 9, thereby performing control such that the load by the electric motor 9 as viewed from the high-pressure turbine 3H via the first rotating shaft 4H decreases relatively. If it is determined that a voltage abnormality is generated in the external grid 50, the abnormality control device 22 performs control so as to increase the torque applied to the high-pressure turbine 3H by the electric motor 9, compared with the time before the occurrence of the voltage abnormality, or to reduce the amount of power generation in the electric motor 9 from the high-pressure turbine 3H, compared with the time before the occurrence of the voltage abnormality.

Here, the abnormal-time control by the abnormality control device 22 in the case where a voltage abnormality is generated in the external grid 50 will be described further in detail, referring to FIGS. 8 to 10.

FIG. 8 is a view showing physical quantities of the dual-shaft gas turbine 6 and the synchronous power generator 7 in the case where the voltage change indicated by the solid line 101 occurs.

As shown in FIG. 8, the output of the dual-shaft gas turbine 6 is substantially at a constant value regardless of the voltage change in the external grid 50. Since the dual-shaft gas turbine 6 is a large mechanical device and the output thereof is decided by the flow rate of compressed air and the temperature of the combustion gas, the time constant of output change is long. Therefore, the dual-shaft gas turbine 6 does not follow a sharp output change generated in the external grid 50 within a time of approximately 0.2 seconds. Although the output of the dual-shaft gas turbine 6 can be reduced to 0 (zero) within a time of approximately 1 to 2 seconds by emergency cut-off, in contrast, the output cannot be increased quickly. Therefore, the output of the dual-shaft gas turbine 6 in the case where emergency cut-off is not carried out is considered constant.

As for the electrical output of the synchronous power generator 7, the output temporarily cannot be sent, due to an accident in the external grid 50. Consequently, a surplus input is generated in the synchronous power generator 7. The product of this surplus input and the abnormality duration is rotational energy in the synchronous power generator 7. Also, the rotational acceleration of the synchronous power generator 7 is decided by the rotational energy and the inertia of the synchronous power generator 7. Therefore, when abnormality occurs, if the abnormality duration is short or if the inertia of the synchronous power generator 7 is large, the change in the rotation speed of the synchronous power generator is small. Also, if the acceleration of the synchronous power generator 7 at the time occurrence of an abnormality is low, the phase of the rotor of the synchronous power generator 7 only has to advance slightly with respect to the grid frequency. This phase difference decreases and returns to the original state, as a synchronizing force acts when the voltage of the external grid 50 is restored.

A synchronizing force P in the synchronous power generator 7 is expressed by the following Equation 1, using an induced voltage E of the synchronous power generator 7, a synchronous reactance Xd, and a load angle σ that is the phase angle between a terminal voltage V and the induced voltage E.

$$P = E^2/(2 \times Xd) \cos \sigma \qquad \text{(Equation 1)}$$

Here, the load angle σ is the voltage phase of the external grid 50 and the phase of the induced voltage E, that is, in the case of a 2-pole power generator, the rotation angle of the power generator rotor 8 itself. As can be seen from the above Equation 1, the synchronizing force P=0 (zero) holds with the load angle σ=90°. In normal operation times, the synchronous power generator 7 operates with the load angle σ≈40°. Therefore, in order for the synchronizing force to act (P>0), the angle of the rotor when the voltage of the external grid 50 is restored from the abnormality needs to be within a range of several ten degrees with respect to the angle of the rotor before the abnormality.

If the phase difference of the rotor exceeds an upper range because of the acceleration of the synchronous power generator 7 due to the occurrence of the abnormality in the external grid 50, the synchronizing force P does not act and therefore the synchronous power generator 7 accelerates immediately, causing a synchronization difference from the frequency of the external grid 50 (see FIG. 10). This state is called a step out. The synchronous power generator 7 cannot generate power in the step out state.

In FIG. 8, since the power generator phase is smaller than π/2, the synchronous power generator 7 returns to the synchronous state of the time before the occurrence of the abnormality, by the synchronizing force P.

FIG. 9 is a view showing physical quantities of the dual-shaft gas turbine 6 and the synchronous power generator 7 in the case where the voltage change indicated by the dashed line 102 occurs.

As described above, if it is determined that a voltage abnormality is generated in the external grid 50, the abnormality control device 22 controls the switching device 501 of the resistance circuit 21 to switch from cut-off to connection. Otherwise, the abnormality control device 22 controls the switching device 501 of the resistance circuit 21 to a cut-off state. Also, if a voltage abnormality in the external grid 50 is detected, the abnormality control device 22 sends an abnormal-time control signal to the frequency converter control device 11 so as to control the frequency converter 10 and thus to control the rotational driving of the electric motor 9, thereby performing control such that the load by the electric motor 9 as viewed from the high-pressure turbine 3H via the first rotating shaft 4H decreases relatively. If it is determined that a voltage abnormality is generated in the external grid 50, the abnormality control device 22 performs control so as to increase the torque applied to the high-pressure turbine 3H by the electric motor 9, compared with the time before the occurrence of the voltage abnormality, or to reduce the amount of power generation in the electric motor 9 from the high-pressure turbine 3H, compared with the time before the occurrence of the voltage abnormality. In normal operation times, there are cases where the electric motor 9 assists the compressor 1 and where the electric motor 9 applies braking on the compressor 1. If a voltage abnormality in the external grid 50 is detected in the case where the electric motor 9 assists the compressor 1, the electric motor 9 increases the amount of assistance. Also, if the amount of assistance is at the upper limit thereof, that amount of assistance is kept. Here, since the electric motor 9 is capable of outputting approximately twice the rated output for a short period of approximately a few seconds on condition of emergency, the amount of assistance can be increased momentarily. Meanwhile, if a voltage abnormality in the external grid 50 is detected in the case where the electric motor 9 applies braking on the compressor 1, surplus energy on the side of the low-pressure turbine 3L is reduced compared to the state before the occurrence of the abnormality, by reducing the amount of power generation by the electric motor 9 or by switching to the assistance for the compressor 1.

As shown in FIG. 9, if it is determined that a voltage abnormality is generated in the external grid 50, the abnormality control device 22 controls the electric motor 9 to assist the rotation of the compressor 1, t4 seconds after the occurrence of the voltage abnormality. That is, at the time t4 and onward, the output power of the synchronous power generator 7 is sent to the compressor 1 via the electric motor 9. Therefore, the surplus input generated in the synchronous power generator 7 changes along the solid line. Also, since the compressor 1 is assisted by the electric motor 9, the rotation speed increases as indicated by the solid line. However, since the power consumption of the compressor 1 is the square to cube of the rotation speed, acceleration does not take place easily and there is little change in speed.

The advantageous effects of the embodiment configured as described above will be described.

In the dual-shaft gas turbine, the low-pressure turbine driving the machine to be driven such as the pump or the power generator, and the gas generator (compressor and high-pressure turbine) generating an actuation gas for the low-pressure turbine can be operated at different numbers of rotations. Therefore, for example, even if the number of rotations of the machine to be driven is lower than the rated number of rotations on the gas turbine side, high efficiency can be achieved by rotating the compressor and the high-pressure turbine at a high speed and generating an actuation gas with a higher expansion work capacity in the low-pressure turbine.

However, in the dual-shaft gas turbine according to the related art, there is a temperature limitation on the high-pressure turbine and a mechanical limitation in terms of centrifugal force on the rotation speed of the compressor. These limitations may consequently cause a fall in efficiency. That is, for example, if the temperature of the outside air taken into the compressor is higher than a preset value, the density of the air is relatively low. In this case, since the work of the combustion gas on the turbine decreases, the rotation speed falls and the flow rate of the air of the compressor decreases. Therefore, the combustion temperature rises and the temperature of the high-pressure turbine vane rises, too. Since the high-pressure turbine has the temperature limitation, the fuel must be reduced and consequently the output and efficiency fall. Meanwhile, if the temperature of the outside air taken into the compressor is lower than a preset value, the density of the air is relatively high. In this case, since the work of the combustion gas on the turbine increases, the rotation speed rises. As the compressor has the limitation on the rotation speed, the fuel must be reduced and consequently the output and efficiency fall.

In contrast, the embodiment is configured to control the frequency converter control device 11 for controlling the frequency converter 10, and the governor 13, on the basis of the power output command value 18 indicating the power to be outputted to the external grid 50, and thereby to control the total output of the dual-shaft gas turbine 6 and the electric motor 9. Therefore, a fall in efficiency due to change in the temperature of the outside air can be restrained.

Also, in the dual-shaft gas turbine power generation system according to the related art, when an abnormality occurs in the external grid, the dual-shaft gas turbine is disconnected (parallel-off) from the external grid and thus protected. However, as the introduction of renewable energy such as wind power is progressing, it is anticipated that the entire power grid may become unstable, and there is a concern that if a certain power generator starts getting parallel-off in order to protect its own device at the time of the occurrence of an abnormality in the external grid, as in the related art, a voltage in the grid as a whole may drop and the parallel-off may spread to other power generators in a chained manner, causing a large-scale blackout.

To cope with such circumstances, in Europe and China, standards that require distributed power sources such as wind power generators and solar power generators to have an operation continuation (fault ride through (FRT)) function even when an abnormality occurs, are formulated. Such a standard that supports the FRT is called a grid code. That is, a grid code is a standard which an operator responsible for the stability of a power grid requires a power producer to follow, and which prescribes that if the voltage at a power generator terminal is within this grid code, the power generator connected to the grid must not get parallel-off. Also, such a measure is required of thermal power generators and gas turbine power generators of a centralized power supply.

However, at the time of a grid accident such as a short circuit, the synchronous power generator temporarily cannot send the energy received from the gas turbine, to the external grid. Thus, there is a risk that the surplus input to the synchronous power generator during the period may accelerate the rotation speed of the synchronous power generator, causing a so-called step out, in which the synchronous power generator goes out of a synchronous state. In the step out state, power cannot be generated. Also, once a step out occurs, it takes a time of several to ten minutes to restore the state where power generation is possible. Therefore, the operation continuation is impossible. Thus, in order to secure the operation continuation function, it is necessary to prevent the synchronous power generator from stepping out.

In contrast, in the embodiment, the abnormality control device 22 is configured in such a way that if a voltage abnormality in which the voltage of the external grid 50 deviates from the grid code is detected, the abnormality control device 22 sends an abnormal-time control signal to the frequency converter control device 11 so as to control the frequency converter 10 and thus to control the rotational driving of the electric motor 9, thereby performing control such that the load by the electric motor 9 as viewed from the high-pressure turbine 3H via the first rotating shaft 4H decreases relatively. That is, the embodiment is configured in such a way that when an abnormality occurs in the external grid 50, the energy on the side of the synchronous power generator 7 connected to the low pressure shaft is instantly shifted to the side of the compressor 1 via the electric motor 9. Therefore, the occurrence of a step out due to the acceleration of the synchronous power generator 7 can be restrained and the continuity of the synchronous operation of the synchronous power generator 7 can be improved.

Also, the abnormality control device 22 is configured in such a way that if it is determined that a voltage abnormality is generated in the external grid 50, the abnormality control device 22 controls the switching device 501 of the resistance circuit 21 to switch from cut-off to connection. Therefore, the surplus output from the synchronous power generator 7 decreases, making a step out less like to occur.

Also, with respect to the surplus power from the synchronous power generator 7 generated in the case where a voltage abnormality is generated in the external grid 50, the two methods of the power control by the electric motor 9 and the consumption by the resistance circuit 21 can be combined. Therefore, the capacity of the electric motor 9 and the capacity of the frequency converter 10 that are necessary to restrain a step out can be reduced and therefore a reduction in cost can be achieved.

Modification of First Embodiment

A modification of the first embodiment of the invention will be described, referring to the drawings.

In the first embodiment, the electric motor 9 as shown in FIG. 2 is used. However, an electric motor 9A as shown in FIG. 11 may also be used.

In FIG. 11, the electric motor 9A has the stator 230 and the rotor 250. The stator 230 is housed in the housing 212. The stator 230 includes the stator iron core 230 fixed to the housing, and the stator winding 238 fixed to the stator iron core 230. Meanwhile, the rotor 250 includes the shaft 218, the rotor iron core 252 fixed to the shaft 218, a conductive bar 255 embedded in the rotor iron core 252, and an end ring electrically connected to the conductive bar 255. The other parts of the configuration are similar to the electric motor 9 of the first embodiment. This modification configured as described above, too, can achieve similar effects to the first embodiment form.

Also, in the first embodiment, the case where the frequency converter 10 provided with the converters 402, 403, which convert AC power to DC and convert DC power to AC, on both the side of the external grid 50 (that is, the side of the synchronous power generator 7) and the side of the electric motor 9, is used is described, as shown in FIG. 3. However, this is not limiting and a frequency converter 10A shown in FIG. 12 may be used instead of the frequency converter 10.

In FIG. 12, the frequency converter 10A has a rectifier 401 which converts AC power on the side of the external grid 50 (that is, the side of the synchronous power generator 7) to DC, the converter 402 which converts the DC-converted power to AC and transmits the power to the side of the electric motor 9, and the capacitor 404 which smoothes the amount of change in power between the converter 403 and the converter 404. In this case, the electric motor 9 is configured to have only an assistance function for the compressor 1. The rectifier 401 is simpler than the converter 403 having both the AC-DC conversion and DC-AC conversion functions and is therefore advantageous in that the cost can be restrained. Here, if the electric motor 9 is configured to have only a braking function for the compressor 1, the converter 402 can be arranged on the side of the external grid 50 and the rectifier can be arranged on the side of the electric motor 9.

Second Embodiment

A second embodiment of the invention will be described, referring to FIG. 13. In FIG. 13, similar members to those in the first embodiment are denoted by the same reference signs and description thereof is omitted.

In the first embodiment, the case where the first rotating shaft 4H and the electric motor 9, and the second rotating shaft 4L and the synchronous power generator 7 are mechanically connected without having a gear in-between, is described. However, this embodiment is a case where these parts are mechanically connected via a gear.

As shown in FIG. 13, the second rotating shaft 4L connected to the low-pressure turbine 3L, and the synchronous power generator 7, are mechanically connected via a reduction drive 24. Also, the first rotating shaft 4H connected to the compressor 1 and the high-pressure turbine 3H and the electric motor 9, are mechanically connected without having a reduction drive 23 in-between. Other parts of the configuration are similar to the first embodiment.

This embodiment configured as described above, too, can achieve similar effects to the first embodiment.

Also, if the rotation speed of the compressor 1 of the dual-shaft gas turbine 6 and the rotation speed of the electric motor 9 do not coincide with each other, another electric motor needs to be prepared in order to adjust the number of rotations on the side of the electric motor 9. Therefore, there is a problem of increased cost. In contrast, in this embodiment, since the electric motor 9 and the compressor 1 are configured to be connected via the reduction drive 23, a general-purpose electric motor can be used for the electric motor 9 and an increase in cost can be restrained. Similarly, since the synchronous power generator 7 and the low-pressure turbine 3L are configured to be connected via the reduction drive 24, a general-purpose synchronous power generator can be used for the synchronous power generator 24 and an increase in cost can be restrained.

REFERENCE SIGNS LIST

1 compressor
2 combustor
3H, 3L gas turbine
4H first rotating shaft
4L second rotating shaft
5 flow rate adjustment valve, inlet guide vane (IGV)
6 dual-shaft gas turbine
7 synchronous power generator
8 power generator rotor
9, 9A electric motor
10, 10A frequency converter
11 frequency converter control device
12 control device
13 governor
14 AVR
15 circuit breaker
16 voltmeter
17 outside air state measuring device (thermometer, barometer, hygrometer)
18 power command value
19A, 19B transformer
20A, 20B current sensor
21 resistance circuit
22 abnormality control device
23 reduction drive
24 reduction drive
26 power transmission path
50 external grid
101 abnormal-time voltage temporal change
102 abnormal-time voltage temporal change
201 grid code
212 electric motor housing
214 electric motor end bracket
216 bearing
218 shaft
222 gap
223 rotation speed detector
224 magnetic pole position detector
238 stator winding
230 stator
232 stator iron core
250 rotor
252 rotor iron core
254 permanent magnet
255 conductive bar
256 end ring
401 rectifier
402, 403 converter (inverter, converter)
404 capacitor
501 switching device
502 resistor

The invention claimed is:

1. A dual-shaft gas turbine power generation system comprising:
    a compressor which pressurizes air and generates compressed air;
    a combustor which mixes and combusts the compressed air and a fuel;
    a high-pressure gas turbine which is driven by a combustion gas obtained in the combustor;
    a first rotating shaft which connects the compressor and the high-pressure gas turbine;
    an electric motor connected to the first rotating shaft;
    a governor which adjusts an amount of air taken into the compressor and thus controls an output of the high-pressure gas turbine;
    a low-pressure gas turbine driven by the combustion gas after driving the high-pressure gas turbine;
    a second rotating shaft connected to the low-pressure gas turbine;
    a synchronous power generator connected to the second rotating shaft generating power of an external grid frequency and connected to an external grid;
    a frequency converter which is provided on a power transmission path to bidirectionally transmit power between the synchronous power generator and the electric motor, and which converts a frequency of power transmitted between the synchronous power generator and the electric motor;
    a control device which controls a frequency converter control device for controlling the frequency converter and the governor on the basis of a power output command value indicating power to be outputted to the external grid, and thus controls a total output of the high-pressure gas turbine, the low-pressure gas turbine and the electric motor;
    a transformer which converts a voltage outputted from the synchronous power generator to the external grid;
    a circuit breaker to cut off power transmitted to the external grid via the transformer;
    a voltage measuring device disposed between the external grid and the circuit breaker and which measures a voltage on a side of the external grid; and
    an abnormality control device which detects a voltage abnormality generated in the external grid on the basis of a result of comparison between a predetermined voltage abnormality reference value for the external grid and the measured voltage by the voltage measuring device, and, when the voltage abnormality is detected, controls the frequency converter control device in such a way that a load, by the electric motor as viewed from the high-pressure turbine via the first rotating shaft, is decreased.

2. The dual-shaft gas turbine power generation system according to claim 1, further comprising:
    an outside air state measuring device which measures a state of air taken into the compressor,
    wherein the control device controls the frequency converter control device and the governor on the basis of the power output command value and the measured state by the outside air state measuring device, and thus controls the total output of the gas turbine and the electric motor.

3. The dual-shaft gas turbine power generation system according to claim 1, further comprising:
    a resistance circuit connected in parallel between the synchronous power generator and the transformer and provided with a switching device for switching between connection and cut-off between the synchronous power generator and the transformer,
    wherein the abnormality control device, when the voltage abnormality is detected, switches the switching device of the resistance circuit from cut-off to connection.

4. The dual-shaft gas turbine power generation system according to claim 1, wherein the electric motor comprises:
    a stator including a stator iron core and a stator winding wound on the stator iron core; and
    a rotor which is rotatable with respect to the stator and which includes a rotor iron core and a plurality of permanent magnets forming a plurality of magnetic poles.

5. The dual-shaft gas turbine power generation system according to claim 1, wherein the electric motor comprises:
    a stator including a stator iron core and a stator winding wound on the stator iron core; and
    a rotor which includes a rotor iron core and a plurality of conductive bars.

6. The dual-shaft gas turbine power generation system according to claim 1, wherein the frequency converter comprises:
    a plurality of converters connected to both a side of the synchronous power generator and a side of the electric motor and which convert power from AC to DC and convert power from DC to AC.

7. The dual-shaft gas turbine power generation system according to claim 1, wherein the frequency converter comprises:
    a converter connected to one of a side of the synchronous power generator and a side of the electric motor and converts power from AC to DC and which converts power from DC to AC, and a rectifier connected to the other one of the side of the synchronous power generator and the side of the electric motor and which converts power from AC to DC.

8. The dual-shaft gas turbine power generation system according to claim 1, wherein:
    the first rotating shaft and the electric motor are mechanically connected without having a gear in-between.

9. The dual-shaft gas turbine power generation system according to claim 1, wherein:
    the second rotating shaft and the synchronous power generator are mechanically connected without having a gear in-between.

10. The dual-shaft gas turbine power generation system according to claim 1, wherein:
    a capacity of the electric motor is smaller than a capacity of the synchronous power generator.

11. A control method for a gas turbine system including a compressor which pressurizes air and generates compressed air, a combustor which mixes and combusts the compressed air and a fuel, a high-pressure gas turbine which is driven by a combustion gas obtained in the combustor, a first rotating shaft which connects the compressor and the high-pressure gas turbine, an electric motor connected to the first rotating shaft, a governor which adjusts an amount of air taken into the compressor and thus controls an output of the high-pressure gas turbine, a low-pressure gas turbine driven by the combustion gas after driving the high-pressure gas turbine, a second rotating shaft connected to the low-pressure gas turbine, a synchronous power generator connected to the second rotating shaft, a frequency converter which is provided on a power transmission path for transmitting power between the synchronous power generator connected to an external grid and the electric motor, and converts a frequency of power to be transmitted, a transformer which converts a voltage outputted from the synchronous power generator to the external grid, and a circuit breaker to cut off power transmitted to the external grid via the transformer, and a voltage measuring device disposed between the external grid and the circuit breaker and which measures a voltage on a side of the external grid, the method comprising:

generating power with the synchronous power generator at an external grid frequency and outputting generated power to the external grid, converting a frequency of power bidirectionally transmitted between the synchronous power generator and the electric motor controlling the frequency converter and the governor on the basis of a power output command value indicating power to be outputted to the external grid, and thus controlling a total output of the high-pressure gas turbine, the low-pressure gas turbine, and the electric motor;

measuring the voltage on the side of the external grid with the voltage measuring device, detecting a voltage abnormality generated in the external grid on the basis of a result of comparison between a predetermined voltage abnormality reference value for the external grid and the measured voltage, and when the voltage abnormality is detected, controlling a load by the electric motor, as viewed from the high-pressure turbine via the first rotating shaft, to decrease.

12. A dual-shaft gas turbine power generation system comprising:

a compressor which pressurizes air and generates compressed air;

a combustor which mixes and combusts the compressed air and a fuel;

a high-pressure gas turbine which is driven by a combustion gas obtained in the combustor;

a first rotating shaft which connects the compressor and the high-pressure gas turbine;

an electric motor connected to the first rotating shaft;

a governor which adjusts an amount of air taken into the compressor and thus controls an output of the high-pressure gas turbine;

a low-pressure gas turbine driven by the combustion gas after driving the high-pressure gas turbine;

a second rotating shaft connected to the low-pressure gas turbine;

a synchronous power generator connected to the second rotating shaft generating power of an external grid frequency and connected to an external grid;

a frequency converter which is provided on a power transmission path to bidirectionally transmit power between the synchronous power generator and the electric motor, and which converts a frequency of power transmitted between the synchronous power generator and the electric motor;

a first control device which controls the frequency converter;

a second control device which controls the first control device and the governor on the basis of a power output command value indicating power to be outputted to the external grid, and thus controls a total output of the high-pressure gas turbine, the low-pressure gas turbine, and the electric motor;

a transformer which converts a voltage outputted from the synchronous power generator to the external grid;

a circuit breaker to cut off power transmitted to the external grid via the transformer;

a voltage measuring device disposed between the external grid and the circuit breaker and which measures a voltage on a side of the external grid; and a third control device which detects a voltage abnormality generated in the external grid on the basis of a result of comparison between a predetermined voltage abnormality reference value for the external grid and the measured voltage by the voltage measuring device, and, when the voltage abnormality is detected, controls the first control device in such a way that a load, by the electric motor as viewed from the high-pressure turbine via the first rotating shaft, is decreased.

* * * * *